United States Patent [19]

Hou

[11] Patent Number: 4,998,812
[45] Date of Patent: Mar. 12, 1991

[54] TELESCOPIC EXTERIOR REAR VIEW MIRROR

[76] Inventor: Mei-Wen H. Hou, No. 200, Fu-Chiang Road, Sec. 2, Yung Kang Shiang, Tainan Hsien, Taiwan

[21] Appl. No.: 552,468

[22] Filed: Jul. 16, 1990

Related U.S. Application Data

[63] Continuation-in-part of Ser. No. 378,980, Jul. 12, 1989, Pat. No. 4,907,871.

[51] Int. Cl.⁵ .......................... G02B 5/08; B60R 1/06
[52] U.S. Cl. .................................. 350/604; 350/626; 350/632; 350/639; 248/478; 248/479; 248/480
[58] Field of Search ............... 350/604, 606, 626, 632, 350/639; 248/476, 477, 478, 480, 479, 483

[56] References Cited

U.S. PATENT DOCUMENTS

| | | | |
|---|---|---|---|
| 4,247,173 | 1/1981 | Vitaloni | 350/604 |
| 4,907,871 | 3/1990 | Hou | 350/604 |
| 4,911,545 | 3/1990 | Miller | 350/604 |
| 4,921,337 | 5/1990 | Hou | 350/604 |
| 4,936,670 | 6/1990 | Yoo | 350/604 |

*Primary Examiner*—Paul M. Dzierzynski
*Assistant Examiner*—R. D. Shafer
*Attorney, Agent, or Firm*—Morton J. Rosenberg; David I. Klein

[57] ABSTRACT

A telescopic exterior rear-view mirror for motor vehicles which includes a first side mirror device having an inner chamber and a second side mirror adapted to move laterally outwardly from a retracted position in the chamber of the first side mirror device into an extended position in a telescopic fashion, a spring disposed between adjacent side walls of the first side mirror device and the second side mirror device for expelling the second side mirror device from the collapsed position into the extended position and a lock and release means for locking the second side mirror device in the collapsed position and operating to release the second side mirror device therefrom.

2 Claims, 5 Drawing Sheets

TELESCOPIC EXTERIOR REAR VIEW MIRROR

The present invention is a continuation in part of U.S. Pat. application Ser. No. 378,980, filed Jul. 12, 1989, now U.S. Pat. No. 4,907,871.

BACKGROUND OF THE INVENTION

This invention relates to a driving mirror for a motorcar, and more particularly to a telescopic exterior rear-view mirror.

SUMMARY OF THE INVENTION

It is, therefore, an object of this invention to obviate such prior disadvantages by providing telescopic exterior rear-view mirrors being arranged to rest against the respective front side windows of a motor vehicle in a usual way for selective usuages mainly according to connection or disconnection with a trailer.

This and other objects, such as will be apparent hereinafter, are achieved by a telescopic exterior rear-view mirror according to the characterizing clause of the appended claims.

DETAILED DESCRIPTION OF A PREFERRED EMBODIMENT

Figure 1:
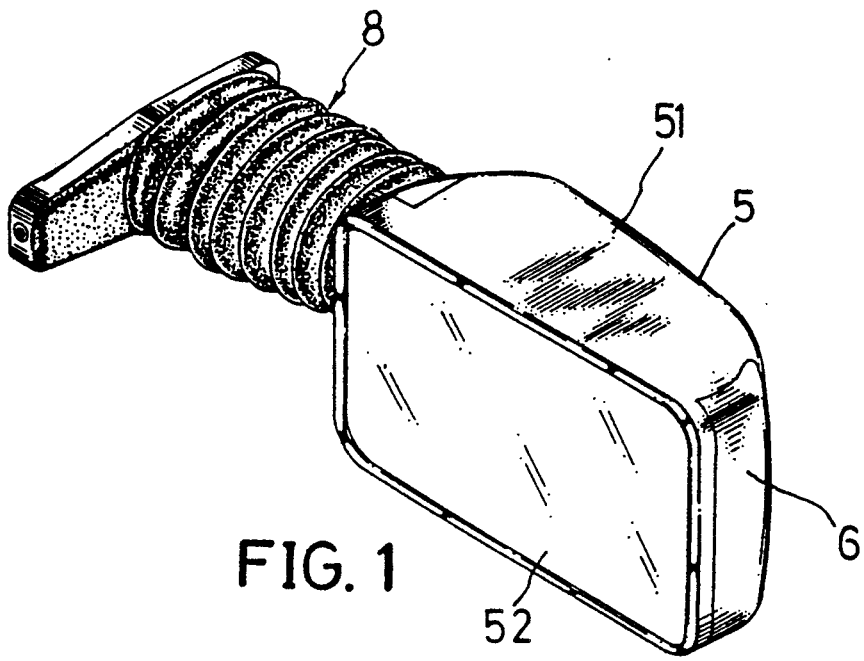
FIG. 1 is a perspective view of a preferred embodiment of the present invention which is in assembled and retracted condition.
Figure 2:
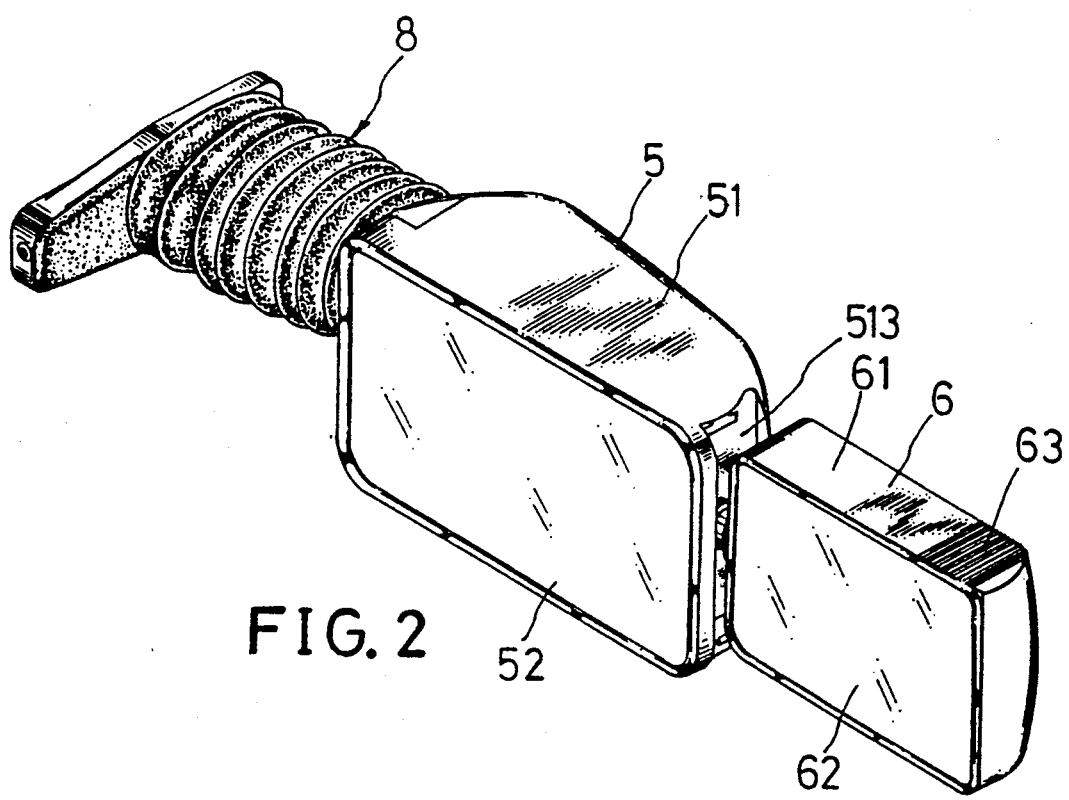
FIG. 2 is a perspective view of the embodiment of the present invention which is in assembled and extended condition.
Figure 3:
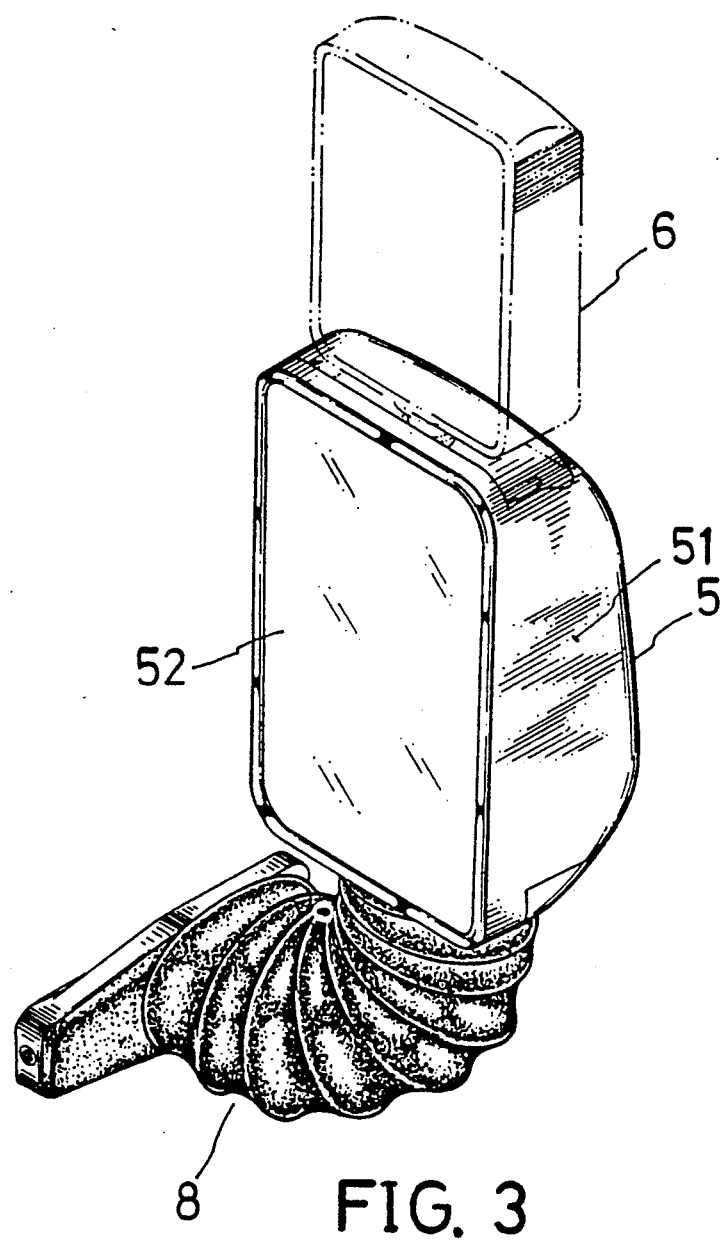
FIG. 3 is a perspective view of the embodiment of the present invention which is in assembled and upwardly bending condition.

In FIGS. 1, 2 and 3, a telescopic exterior rear-view mirror 5 is arranged to rest against the front side window of a motor vehicle. The telescopic exterior rear-view mirror 5 consists essentially of a mirror foot 8, a first side mirror 5 having a first housing 51 carrying a first mirror 52 facing rearwardly, a second side mirror 6 having a second housing 61 carrying a second mirror 62 facing rearwardly and adapted to move within the first side mirror 5 in a telescopic fashion through a side opening 513 formed in a side wall of the first housing 51. The front portion of top and bottom walls of the second housing 6 have roughened surfaces 63. The first side mirror 5 can be located upwardly by bending the mirror foot 8 and the second side mirror 6 can be extended upwardly that enables driver of the car to see the loading condition such as bagages or the like loaded on the roof of the car during driving.

Figure 4:
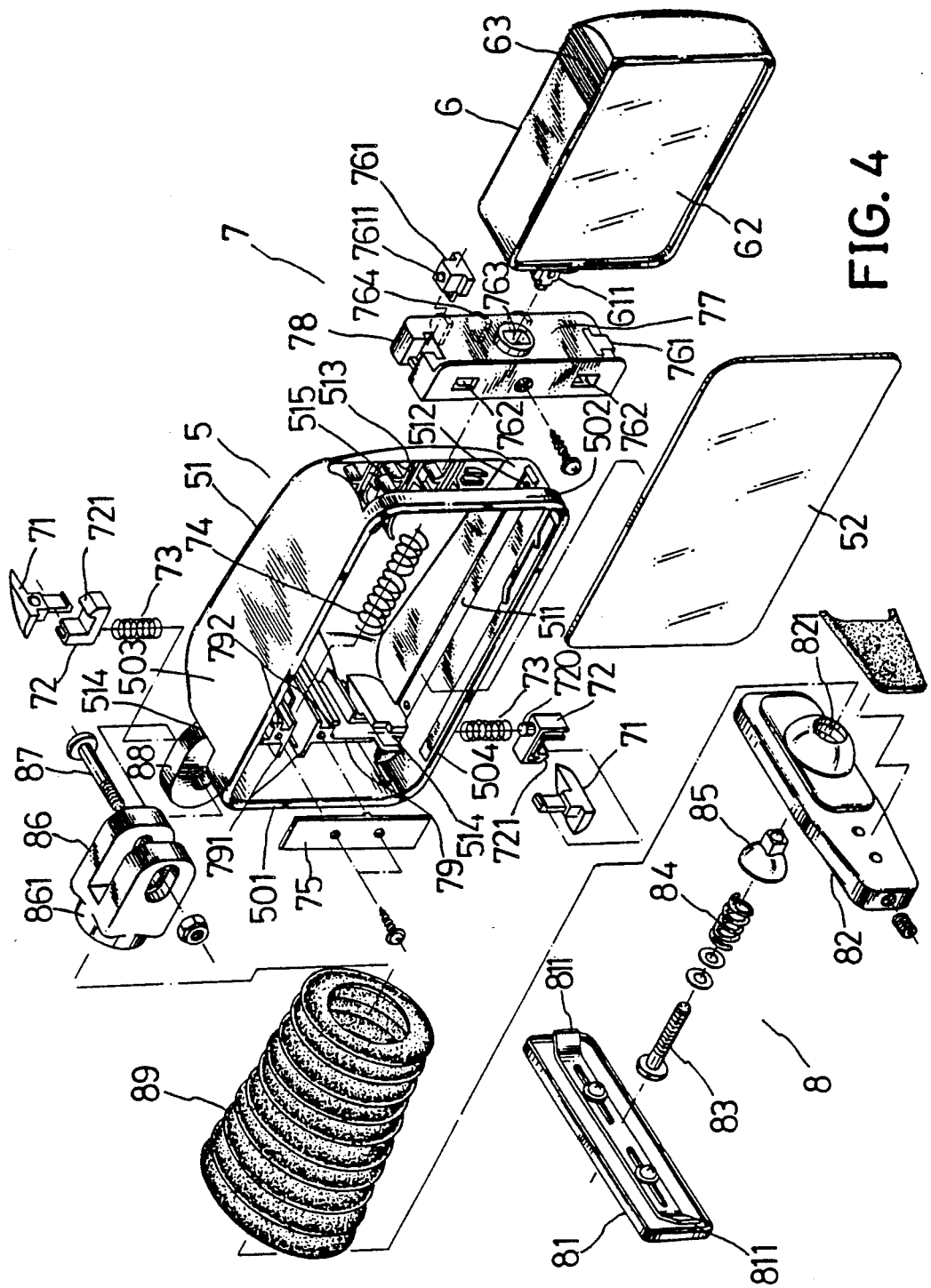
FIG. 4 is a perspective and exploded view of the embodiment of the present invention.
Figure 5:
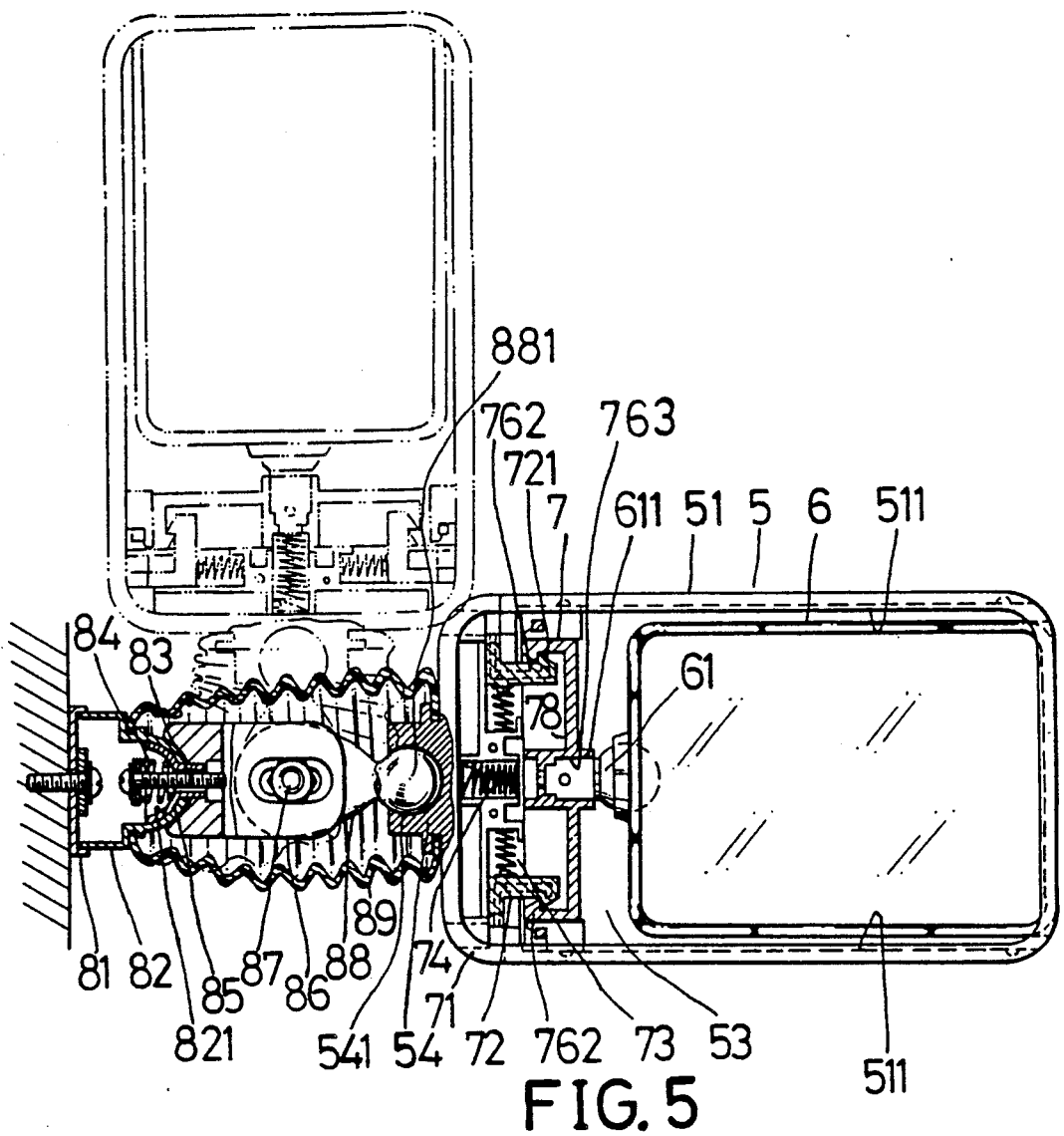
FIG. 5 is a transversely cross-sectional view of the exterior mirror which is in retracted condition.
Figure 6:
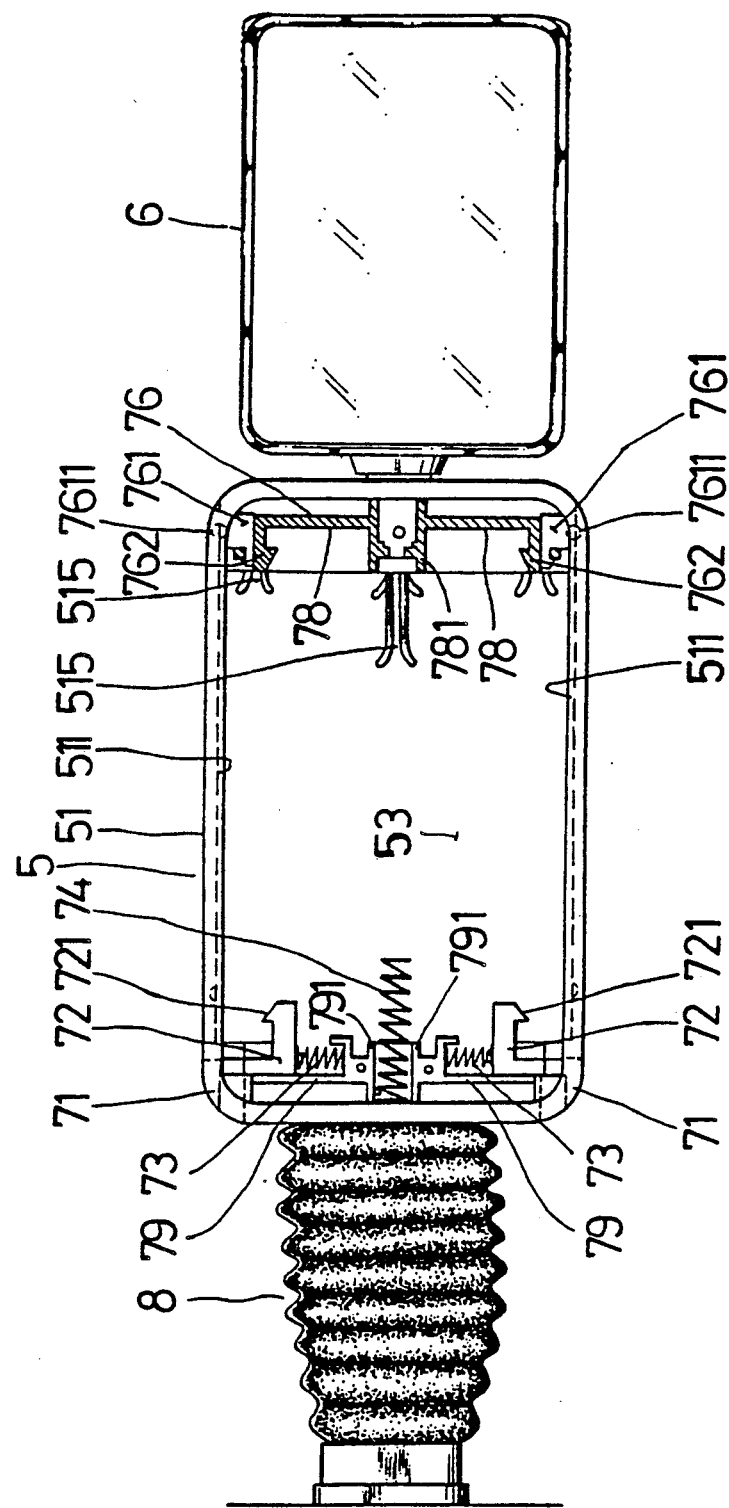
FIG. 6 is a transversely cross-sectional view of the exterior rear view mirror which is in extended condition.

Refering to FIGS. 4, 5 and 6, the mirror foot 8 includes a basement 81 secured to the body of the car by means of screws, an engagement member adustably secured on to the basement 81 and having wing members 811 extending outwardly upwardly from the basement 81 for engaging a cover member 82, a screw 83 extending through washers, spring 84, dome-shaped member 85 and opening 821 formed in the cover 82 and further threaded into a screw hole formed in an end poriton 861 of a conventional swing joint 86 for securing the swing joint 86 to the basement 81, and a cone-shaped bar 88 having a ball 881 on the apex and a perforated end turnably mounted in the joint 86 by means of a bolt and nut assembly 87.

The first side mirror device 5 is laterally and adjustably connected to the mirror foot 8 through a conventional ball joint assembly, which, in this application, comprises a concave recess 541 formed in a side wall body 54 of the first housing 51, and said ball 881, on the apex of the bar 88, relatively rotatably received in the concave recess 541.

A corrugated sleeve member 89 is mounted around the mirror foot 8 and disposed between the basement 81 and the side wall body 54 of the first housing 51 for preventing the mirror foot 8, especially the ball joint assembly and the swing joint 86, from weather or dust.

The first housing 51 includes a pair of parallel vertical side walls 501, 502, a pair of parallel horizontal side walls 503, 504 and a streamlined rear side wall which defines an inner chamber 53 for accommodating the second side mirror 62 and a front opening for carrying the first mirror 52. A pair of sliding grooves 511 is transversely formed in the inner surfaces of the horizontal side walls 503, 504 of the first housing 51.

The second side mirror device 6 is laterally and adjustably connected to an intermediate body 7 through another conventional ball joint 61. Said intermediate body 7 has a leading side 77 formed with a socket member 763 for receiving an end portion 611 of the ball joint 61 which is secured in position by means of transverse screw hole and screw 764, a lagging side 78 formed with spaced hook members 762, sliding bodies 761 having metal balls 7611 mounted in top ends thereof for engaging recesses 512 formed in end portions of the sliding grooves 511 and being engaged in grooves formed in opposite ends thereof for slidably mounting the intermediate body 7 in the chamber 53 and projections 764 for sliding along respective rails 515 defined by parallel ribs locating on inner surface of the rear side wall close to the side opening 513. Said intermediate body 7 allows the second mirror device 6 to be moved between a retracted position in the chamber 53 and an extended position through the side opening 513 formed in the vertical side wall 502.

A pair of opposed partition members 79 extending inwardly from inner surfaces of the horizontal side walls 503, 504 close to the vertical side wall 501 and terminating with horizontal plates 791 to define a chamber for retaining one end portion of a helical spring 74 which is further confined in positionwith a plate 75 by means of screws. A spring retainer 781 having a recess facing the other end of the helical spring 74 is provided on the lagging side of the intermediate body 7.

A control device for releasing the second side mirror device 6 from its retracted position to extend is formed in an inner side of the first housing 51. Said control device includes a pair of press buttons 71 movably fitted in openings 514 opposedly formed in horizontal side walls 503, 504, a pair of locking members 72 each having a vertical end for firmly receiving one end of the button 71 and a horizontal end formed with a projection 720 for retaining one end of a spring 73 and terminated with a hook 721 adapted to engage the hook member 762 of the intermediate body 7. The outer end of each of the springs 73 is retained in a recess defined by a retainer member 792 of the partition members 79 so as to bias locking member 72 outwardly for a firm engagement between lock members 721, 762 of locking members 72 and the intermediate body 7 when the second side mirror device is located in its retracted position.

In release operation, the press buttons 71 are pressed with fingers to move locking members 72 inwardly by overcoming biasing force of the springs 73 that allows release of the second side mirror device 6 from its retracted position to be expelled transversely towards its extended position by means of the compressed spring 74. Said second side mirror device 6 can be pulled to its extended position by seizing roughened surfaces 63 thereof and is kept in extended position through engagement between metal balls 7611 and the recesses 512 in outer ends of the sliding grooves 511.

Said second side mirror device 6 can be retracted by pushing it inwardly to its retracted position where the hook members 721 of the locking members 72 automatically engage the hook members 762 of the intermediate body 7 so as to lock the second side mirror device 6 in ints extracted position.

I claim:

1. A telescopic exterior rear-view mirror for motor vehicles comprising:
   a first side mirror device having a housing defining an inner chamber and carrying a first mirror, said housing having a first side wall, and a second side wall opposed to the first side wall, said second side wall having an opening formed therethrough;
   secure means for securing the housing to the body of the motor vehicle;
   a first ball joint connector rotatably adjustably interconnecting the secure means and the first side wall of the housing;
   rail means transversely arranged in the housing;
   a second mirror device having a frame member carrying a second mirror facing a direction substantially corresponding to that of the first mirror, adapted to be stored in the chamber of the housing of the first side mirror device, having a lagging side wall and leading side wall respectively corresponding to the first side wall and the second side wall of the housing and movable between a retracted position in the housing and an extended position through the opening in the second side wall of the housing;
   an intermediate body having a lagging side and a leading side respectively corresponding to the lagging side wall and leading side wall of the frame member of the second side mirror device;
   hook members spacedly and integrally formed on a lagging side wall of the intermediate body;
   a second ball joint assembly connector rotatably adjustably interconnecting the leading side of the intermediated body and the lagging side wall of the frame member of the second side mirror device;
   a slide member adapted to be slidably engaged in the rail means and attached to the intermediate body for sliding the second side mirror device between a retracted position and an extended position;
   a spring unit disposed between the first side wall of the housing and the lagging side of the intermediate body for expelling the second side mirror device from the retracted position into the extended position;
   a pair of retaining members opposedly formed on the first side wall of the housing and having respective recesses for retaining two end portions of a spring; and
   a lock and release means having a partition board extending across the parallel horizontal side walls of the housing and having opposite recesses, locking members having hook members for engaging the hook members on the intermediate body as the second side mirror is located in its retracted position and means to release the engagement between the hook members between the locking members and the intermediate body.

2. A telescopic exterior rear-view mirror for motor vehicles as claimed in claim 1 wherein the first ball joint is secured to the secure means through a turnable joint assembly for turning the first side mirror device upwardly.

* * * * *